C. J. HAGSTROM.
FASTENING DEVICE FOR SHUTTERS AND THE LIKE.
APPLICATION FILED DEC. 20, 1911.
1,039,388.
Patented Sept. 24, 1912.
4 SHEETS—SHEET 3.
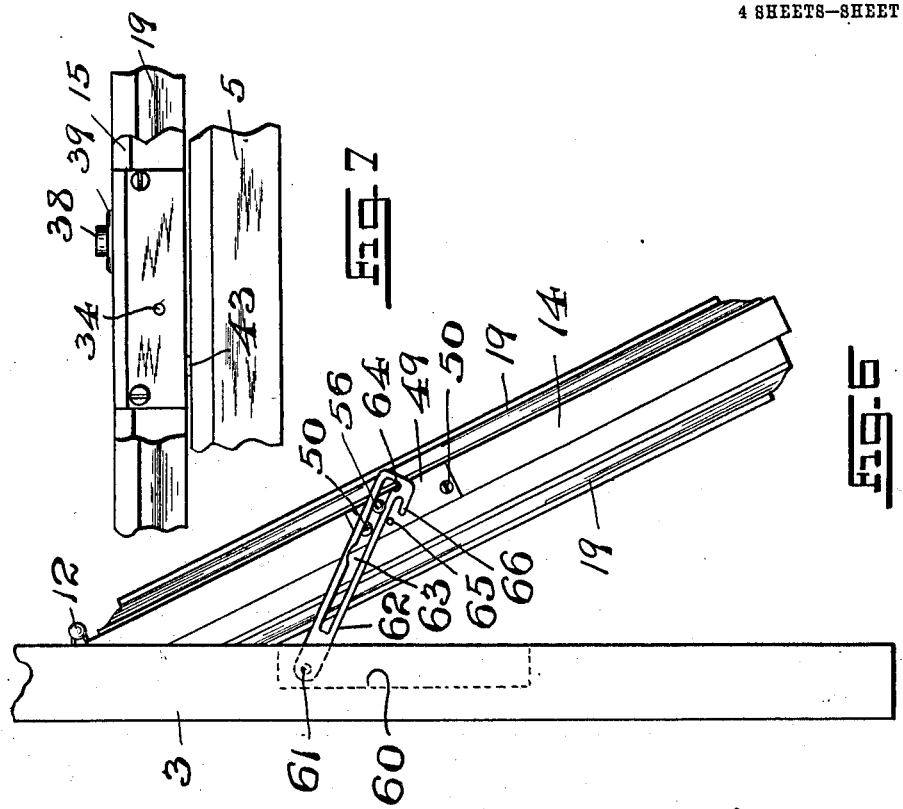
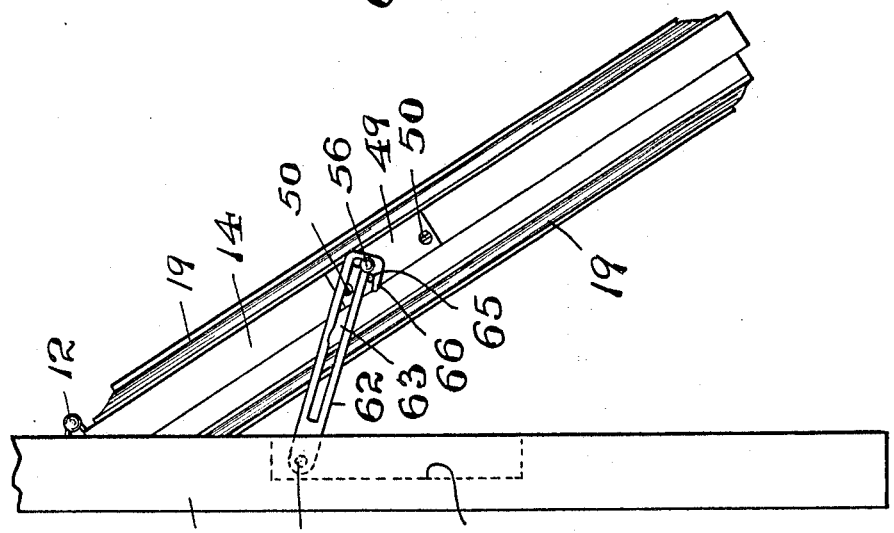
INVENTOR:
Carl J. Hagstrom,
BY
Fraentzel and Richards,
ATTORNEYS

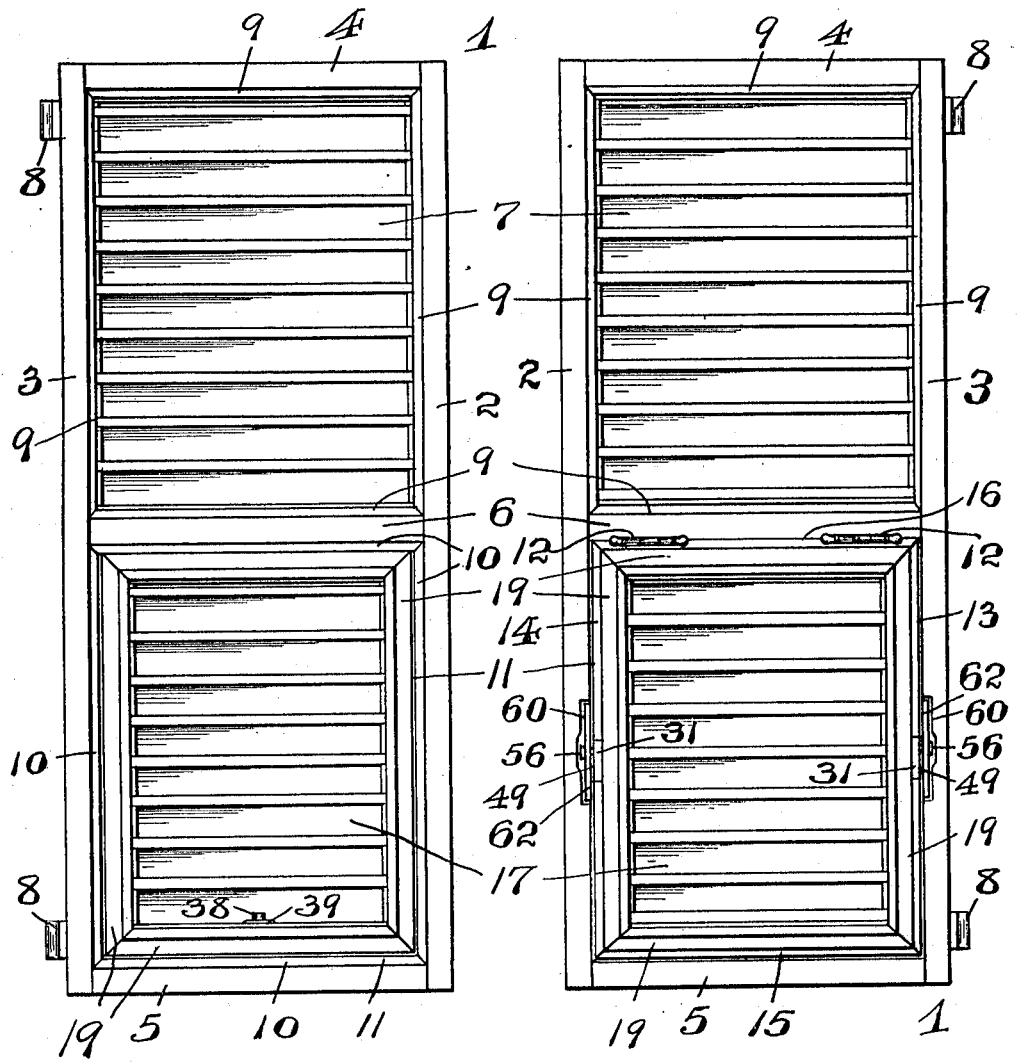

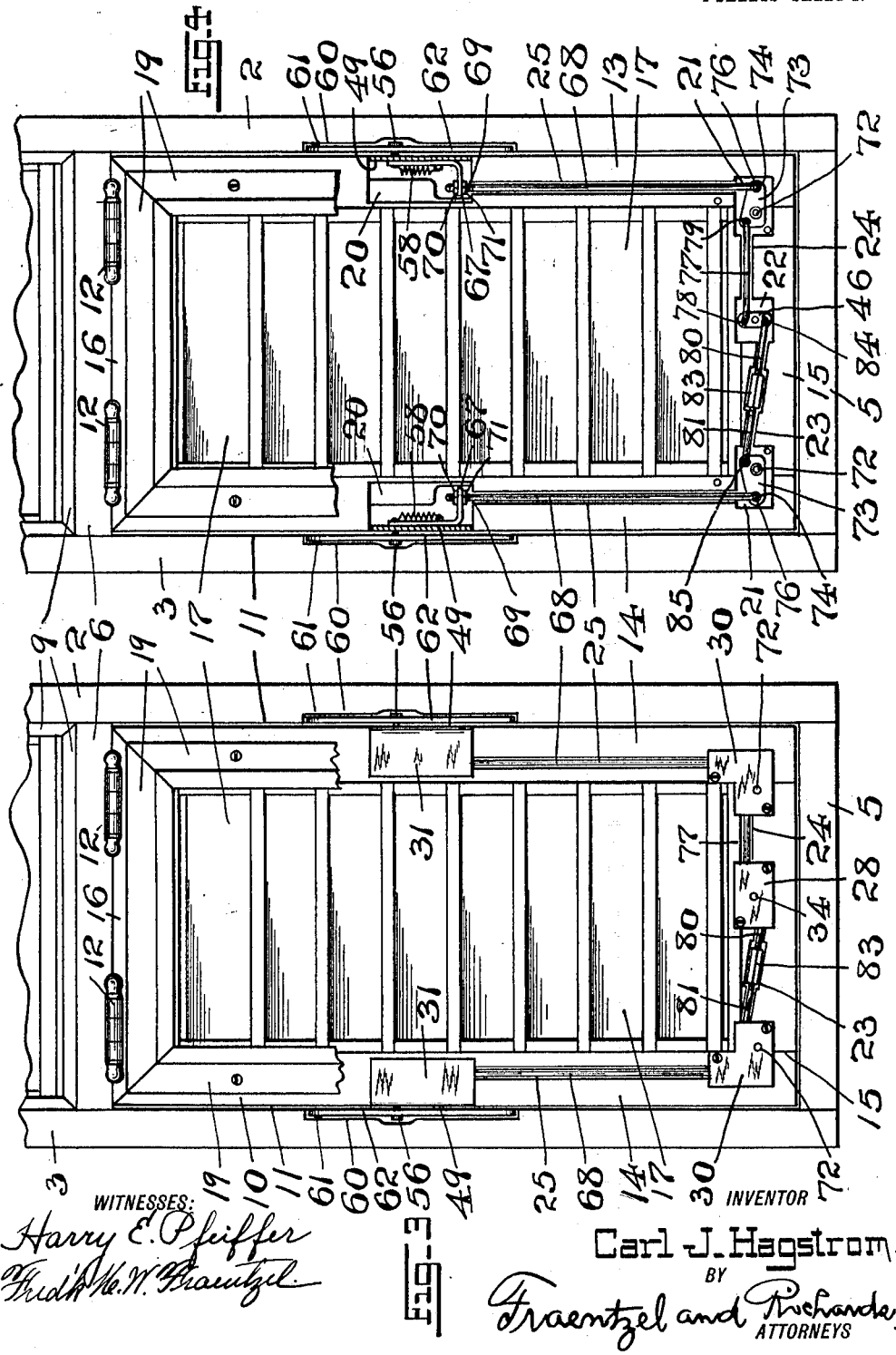

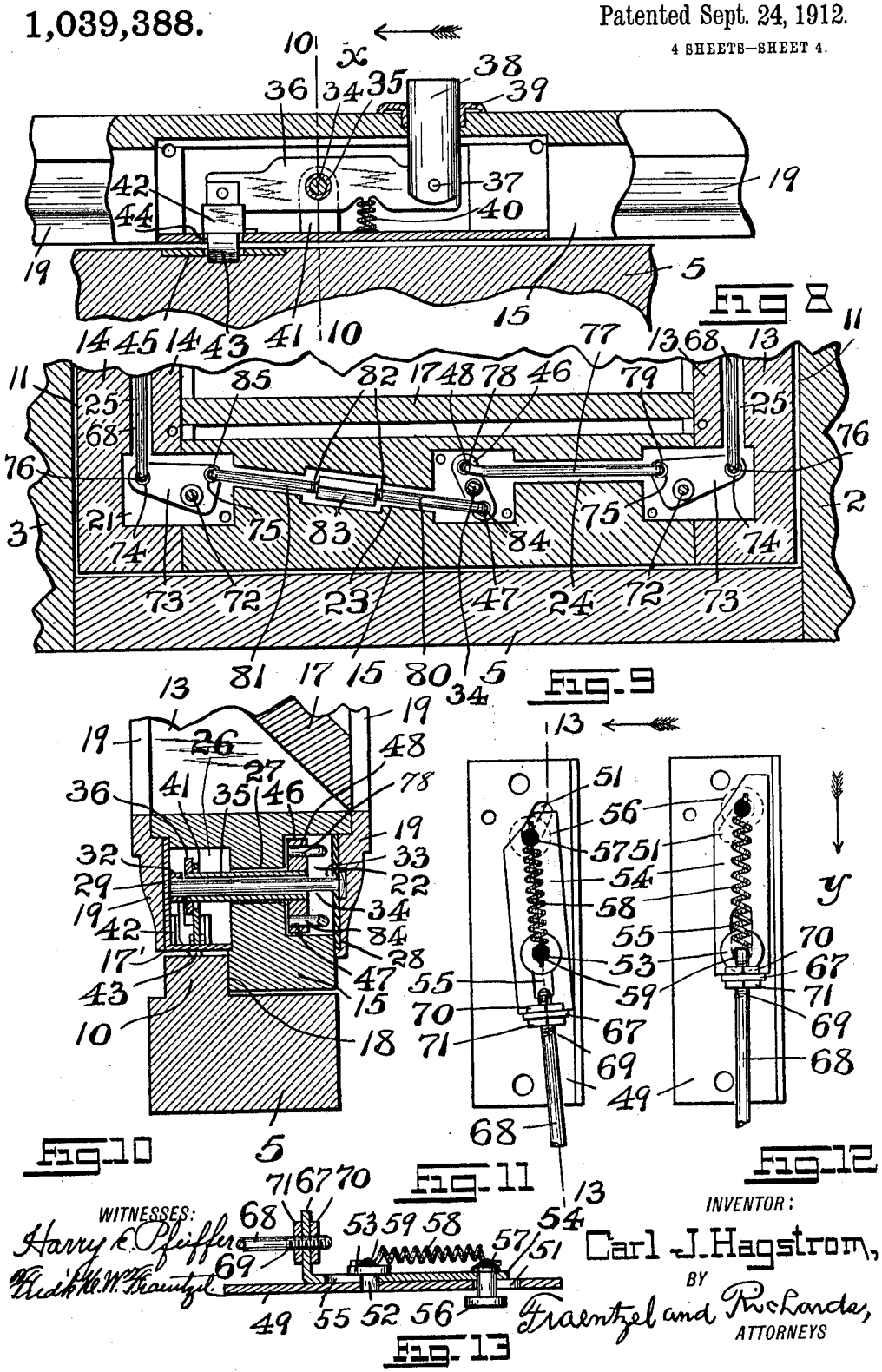

UNITED STATES PATENT OFFICE.

CARL J. HAGSTROM, OF GLEN COVE, NEW YORK.

FASTENING DEVICE FOR SHUTTERS AND THE LIKE.

1,039,388.   Specification of Letters Patent.   Patented Sept. 24, 1912.

Application filed December 20, 1911. Serial No. 666,901.

*To all whom it may concern:*

Be it known that I, CARL J. HAGSTROM, a subject of the King of Sweden, residing at Glen Cove, in the county of Queens and State of New York, have invented certain new and useful Improvements in Fastening Devices for Shutters and the Like; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in fastening devices for shutters, blinds, windows and the like; and, the invention relates, more particularly, to a novel and simple construction of fastening means which will maintain the shutter or the like locked when in closed position and which will also hold said shutter or the like in its open position.

The invention has for its principal object to provide a mechanism for locking the shutter or the like in its closed position, and also for manipulating the said shutter in moving it outwardly into its opened position and retaining the same in such position, and also for releasing the shutter or the like from its said open position when it is desired to again close and lock the same.

Other objects of this invention not at this time more particularly enumerated will be clearly evident from the following detailed description of the said invention.

With the various objects of the present invention in view, the said invention consists, primarily, in the novel outside shutter or blind for buildings hereinafter set forth; and, the invention consists, furthermore, in the novel arrangements and combinations of the various devices and parts, all of which are hereinafter more fully described, and then finally embodied in the clauses of the claims which are appended to and which form an essential part of this specification.

The invention is clearly illustrated in the accompanying drawings, in which:—

Figure 1 is an elevation or face view of a hinged shutter embodying the principles of the present invention, said view showing that face of the shutter which is toward the building when the shutter is closed; and Fig. 2 is a face view of the reverse side of the shutter. Figs. 3 and 4 are face views of the lower portion of the shutter with certain parts of the framework of the shutter broken away, showing one general arrangement of the operating mechanism for manipulating the separately hinged shutter-section, said views being made on enlarged scales. Fig. 5 is a side elevation of the lower portion of the shutter, with the separately hinged shutter-section represented in its opened and angular relation to the main shutter; and Fig. 6 is a similar view of the same parts, but showing a different angular position of the said separately hinged shutter-section, disconnected from its retained engagement with a pair of pivotally arranged holding stays, the said view representing the said separately hinged shutter-section in its relative position about to be closed. Fig. 7 is a detail face view of portions of the shutter-construction, showing in connection therewith a face view of a suitably constructed lock employed in connection with the said separately hinged shutter-section; and Fig. 8 is a detail longitudinal vertical section of the said parts represented in said Fig. 7, said view being made on an enlarged scale. Fig. 9 is a sectional representation, on an enlarged scale, of the lower portions of the frame-work of the main shutter and the separately hinged shutter-sections, said view showing in connection therewith, and in elevation, portions of the mechanism for manipulating the said separately hinged shutter-section. Fig. 10 is a transverse vertical section, taken on line 10—10 in said Fig. 8, looking in the direction of the arrow *x*. Fig. 11 is an inner face view of a device for manipulating the hinged stays of the mechanism, the parts being represented in their normal initial positions; Fig. 12 is a similar view of the same parts, but showing the said parts in their operated positions; and Fig. 13 is a vertical section of the same, said section, taken on line 13—13 in said Fig. 11.

Similar characters of reference are employed in all of the said above described views, to indicate corresponding parts.

The said drawings illustrate the novel fastening devices connected with a hinged shutter section consisting of a suitable framework comprising a pair of side-members 13 and 14 which are connected at the bottom by a bottom-member 15 and at the top by a top-member 16, as will be clearly evident from an inspection of Figs. 2 and 9 of the drawings, and connected with the said side-members 13 and 14, and extending laterally across the open portion of this frame-work, thus provided, are angularly disposed slats 17. The said side-members 13 and 14 and 15 are respectively provided with the depressions or pockets 20, 21, and 22, the said pockets 21 and 22 being respectively connected by means of suitably formed grooves or channels 23 and 24, and the said pockets 20 and 21 being likewise connected by suitably formed grooves or channels 25. In the lower end-member 15, and located directly back of said depression or pocket 22 is another depression or pocket 26, said pockets 22 and 26 being suitably connected by means of a tubular portion 27, as clearly illustrated in said Fig. 10 of the drawings. The depression or pocket 22 is preferably closed by means of a suitably formed plate 28, and the said pocket 26, which is also open at the bottom, is closed by means of a right-angled plate 29. In like manner, the pockets 21 are closed by means of suitably formed plates 30, and the pockets or depressions 20 are closed by suitably formed right-angled plates 31. The said plate 29 has suitably connected with its upright member and extending from the inner face thereof, and into the depression or pocket 26, a bearing-portion, as 32, and in the plate 28, and in alinement with said bearing-portion 32, is a hole or perforation 33 which, as will be evident, also forms a bearing-portion. Suitably mounted in said bearing-portions 32 and 33, thus provided, and extending from the depression or pocket 22, through the tubular portion 27, and across the said depression or pocket 26, is a stem or rod, as 34, upon which is oscillatorily mounted a sleeve or piece of tubing 35. Suitably connected with the end-portion of said sleeve or tubing 35, within the depression or pocket 26, is a beam or plate-like member or element, as 36, which has pivotally connected therewith, by means of a pin 37, an upwardly extending push-piece 38. The upper end-portion of said push-piece extends through a tubular portion in the bottom-member 15 of the hinged shutter-section, and through and above a suitably formed socket-member 39, in the position represented in Fig. 1 of the drawings, for its easy manipulation. The normal position of the said beam or plate-like member or element 36, indicated in Fig. 8 of the drawings, is produced by means of a coiled or other suitable spring 40, as will be clearly understood from an inspection of said Fig. 8. Lateral movement of the said sleeve or tubing 35 is prevented by means of a suitably formed guard-plate or post, as 41, which is suitably secured to and extends in an upward direction from the lower and laterally extending member of the right-angled plate 29. Suitably secured to and extending downwardly from the other end-portion of said beam or plate-like member or element 36, and movably arranged in a suitably formed guide, as 42, is a locking bolt or latch-member 43, said bolt or latch-member extending through a suitable opening 44 in the laterally extending member of the right-angled plate 29, and being adapted to be slipped into holding or retaining engagement with a latch-plate 45, with which the end-member 5 of the main frame of the shutter or blind is provided, substantially in the manner illustrated in said Fig. 8 of the drawings.

From an inspection of said Fig. 8 it will be seen, that when the push-piece 38 is pushed in a downward direction, the said locking bolt or latch-member 43 will be removed from its holding engagement with the latch-plate 45, so that the hinged shutter-section can be moved outwardly into its angular relation to the main frame-work of the shutter or blind, as represented in Figs. 5 and 6 of the drawings. As soon as the pressure is removed from the push-piece 38, the spring 40 will again return these parts to their normal initial positions, with the locking bolt or latch-member 43 ready to be again sprung into its holding engagement with the latch-plate 45, when the hinged lower shutter-section is again returned into its closed position. Upon the opposite end-portion of said sleeve or tube 35, within the depression or pocket 22, and suitably secured thereon, is a lever-like member or element 46, which is adapted to be moved, so as to stand at an angle, as shown in Fig. 9 of the drawings, said member or element being provided at its respective end-portions with suitable receiving members in the form of holes or perforations 47 and 48.

Suitably secured within and adapted to close the open side-portions of the recessed parts or pockets 20 in the side-members of said hinged shutter-section, are the right-angled plate-like members or elements 31, the members 49 thereof being secured to the said shutter-section by means of screws 50, or other suitable fastening devices, as will be clearly understood from an inspection of Figs. 5 and 6 of the drawings. Each plate-like member or element 49 is provided with an angularly disposed elongated slot or opening, as 51, and with an inwardly projecting pin 52, upon which is mounted a washer 53. Slidably disposed upon each plate-like member or element 49 is another plate 54, said plate 54 being formed with an elongated opening or slot 55, into and through which the said pin 52 extends, and above which plate 54 the said washer 53 is arranged upon said pin 52. Extending from the opposite side of each plate 54, and secured to the same, is a pin 56 which extends into and through the slot 51 in said plate-like member or element 49. The one end-portion of said pin 56 is made so that it will project slightly from the opposite face of the plate 54, being positively secured in place by means of solder 57, or in any other suitable manner, and having also secured thereto the one end-portion of a spring 58. The opposite end-portion of said spring is secured by means of a solder 59, or in any other suitable manner, to the pin 52, whereby the spring 58 always has a tendency to slide or draw the plate 54 upon the plate-like member or element 49 in the direction of the arrow y indicated in Fig. 12 of the drawings.

At the proper places, the side-members 2 and 3 of the main frame-work are cut away or recessed upon their face toward the hinged shutter-section, as at 60, and arranged within each cut-away or recessed part 60, and adapted to swing upon a pivot-pin 61, is a supporting bar or stay 62 which is provided with a long elongated opening or slot 63 and the cut-away or recessed part 64 near the free end of the bar or stay 62. The free end-portion of each pin 56, hereinabove mentioned, extends freely into an elongated opening or slot 63 of said supporting bars or stays 62, so that when the hinged shutter-section is moved in an outward direction, each bar or stay 62 will ride freely upon the projecting end-portion of the pin 56 within the slot 63, until the cut-away or recessed parts 64 are reached, when the said projecting end-portions of the pins 56, owing to the action of the springs 58, drop into the said cut-away or recessed parts 64, so as to positively hold the hinged shutter-section in its angular open relation to the main frame-work, as clearly indicated in Fig. 5 of the drawings. In addition, each plate-like element or member 49 may also be provided with a suitably disposed lock-pin, as 65, and each supporting rod of stay may be formed with a hook-shaped element, as 66, adapted to enter into holding engagement with the pin 65, when the parts are in the positions indicated in said Fig. 5 of the drawings. The disposition of said pins 65 and forms of said hook-shaped elements 66 are such, that as soon as the pins 56 are raised out of their holding relation within said cut-away or recessed parts 64 by the mechanism to be presently described, they will immediately pass from their retaining or holding engagement with the said hook-shaped element 66, as will be clearly evident.

Each plate-like member or element 49 is provided with a perforated arm or projection, as 67, in which is mounted the screw-threaded end-portion 69 of a connecting rod 68, each rod 68 being freely arranged within one of the grooves or channels 25 previously mentioned. The said screw-threaded end-portions 69 of said rods 68 are adjustably fixed to the said perforated arms or projections 67 by means of suitable lock-nuts 70 and 71 arranged upon said screw-threaded end-portions 69 and upon the opposite sides of said arms or projections 67, substantially as shown. Within the said previously mentioned depressions or pockets 21, and pivotally mounted upon suitably disposed posts 72 in said pockets are oscillating crank-like plates or members, as 73, each plate or member 73 being suitably provided with receiving eyes or perforations 74 and 75. The lower end-portion of each connecting rod 68 is suitably bent, as at 76, each bent portion 76 being pivotally disposed within a receiving eye or perforation 74.

Arranged within the channel or groove 24 is a connecting rod 77, provided at its respective end-portions with the bent members 78 and 79 which are pivotally disposed in the holes or perforations 48 and 75 of the respective members 46 and 73. In a like manner, there are placed within the groove or channel 23, two connecting rods 80 and 81, which are respectively provided with the right and left screw-threaded end-portions 82, and are adjustably connected by means of a connecting adjusting nut, as 83, or any other suitably formed adjusting connecting means. The opposite end-portions of the respective connecting rods 80 and 81 are provided with the bent members 84 and 85 which are pivotally disposed in the holes 47 and 75 of the respective members 46 and 73, substantially as shown, and as will be clearly evident from an inspection of the several figures of the drawings.

Having in the foregoing description set forth one general arrangement and combination of devices for carrying out the purposes of the present invention, I will now briefly describe the operation of the same.

For sake of illustration, suppose that the hinged shutter-section is closed, and is retained in such closed relation by the latch-member 43 of the beam or plate-like member 36. Upon applying pressure upon the push-piece 38, the said beam or member is sufficiently oscillated so that the latch-member is withdrawn from its holding engagement with the bottom-member or bar 5 of the frame-work, the mechanism which is connected with the bars or stays 62, as a matter of course, being also operated, but without affecting the relative positions of said stays. The shutter-section can now be swung outwardly upon its hinges, until the previously mentioned pins 56 are moved into their holding or retaining engagement with the cut-away or recessed portions 64, as has been previously stated, so as to lock and hold the said shutter-section in its opened relation to the main frame-work. In the meantime, the pressure having been removed from the push-piece 38, the springs 40 and 58 cause the various devices and parts of the actuating mechanisms to again resume their normal relations to one another. When it is desired to again bring the hinged shutter-section into its closed relation with the frame-work, pressure is again applied upon the push-piece 38, whereby the beam 38 is again oscillated, and the mechanism between said beam and the plate-like members or elements 49 is once more actuated, and in such a manner, that the pins 56 are raised out of their holding engagement with the cut-away or recessed portions 64 of the stays 62, and the hinged shutter-section can again be closed, with the latch-member 43 sliding into holding and retaining engagement with the bottom-member or bar 5 of the frame-work.

I am fully aware, that some changes may be made in the arrangements and combinations of the various devices and parts, as well as in the details of the construction of the same, without departing from the scope of the present invention as set forth in the foregoing specification, and as defined in the claims which are appended thereto. Hence, I do not limit my invention to the exact arrangements and combinations of the devices, and parts as described in the said specification, nor do I confine myself to the exact details of the construction of the said parts, as illustrated in the accompanying drawings.

I claim:

1. In a device of the kind described, a hinged shutter-section, pivoted retaining stays mounted exteriorly of said shutter-section, movable pins connected with the lateral edges of said shutter-section and adapted to engage said retaining stays to hold said shutter-section in opened position, a stem or rod extending laterally across a portion of said shutter-section, a sleeve oscillatorily mounted upon said stem or rod, means upon one end of said sleeve for normally locking said shutter-section in closed position, and means connected with the other end of said sleeve for disengaging said movable pins from their retaining engagement with said stays to permit the closing of said shutter-section.

2. In a device of the kind described, a hinged shutter-section, pivoted retaining stays mounted exteriorly of said shutter-section, movable pins connected with the lateral edges of said shutter-section and adapted to engage said retaining stays to hold said shutter-section in opened position, a stem or rod extending laterally across a portion of said shutter-section, a sleeve oscillatorily mounted upon said stem or rod, a beam mounted upon one end of said sleeve, a lock-bolt connected with said beam for normally locking said shutter-section in closed position, a push-piece for releasing said lock-bolt, and means connected with the other end of said sleeve for disengaging said movable pins from their retaining engagement with said stays to permit the closing of said shutter-section.

3. In a device of the kind described, a hinged shutter-section, pivoted retaining stays mounted exteriorly of said shutter-section, a stem or rod extending laterally across a portion of said shutter-section, a sleeve oscillatorily mounted upon said stem or rod, a beam mounted upon one end of said sleeve, a lock-bolt connected with said beam for normally locking said shutter-section in closed position, a push-piece for oscillating said sleeve and beam to release said lock-bolt, plate-like members connected with the side-portions of said shutter-section, a slide-plate movably disposed upon each plate-like member, a pin extending from each slide-plate, said pins being in movable engagement with said stays, and means between the other end of said sleeve and the said side-plates for actuating the latter to disengage said pins from their retaining engagement with said stays to permit the closing of said shutter-section.

4. In a device of the class described, a hinged shutter-section, pivoted retaining stays mounted exteriorly of said shutter-section, a stem or rod extending laterally across a portion of said shutter-section, a sleeve oscillatorily mounted upon said stem or rod, a beam mounted upon one end of said sleeve, a lock-bolt connected with said beam for normally locking said shutter-section in closed position, a push-piece for oscillating said sleeve and beam to release said lock-bolt, plate-like members connected with the side-portions of said shutter-section, a slide-plate movably disposed upon each plate-like member, a pin extending from each slide-plate, said pins being in movable engagement with said stays, a lever-like element mounted upon the other end of said sleeve, crank-like plates pivotally connected with said shutter-section, connecting rods between said lever-like element and said crank-like plates, and connecting rods between said crank-like plates and said slide-plates, all arranged for actuating said slide-plates to disengage said pins from their retaining engagement with said stays to permit the closing of said shutter-section.

5. In a device of the kind described, a hinged shutter-section, a retaining stay pivotally connected exteriorly of said shutter-section, said stay being formed with an elongated opening and a cut-away portion connected with said opening, a movable pin connected with said shutter-section, said pin extending into said opening of the stay and being adapted to be moved into retaining engagement with said cut-away portion of the same to retain said shutter-section in opened position, and means for operating said movable pin to disengage the same from said cut-away portion of said stay to permit said shutter-section to be closed.

6. In a device of the kind described, a hinged-shutter-section, a retaining stay pivotally connected exteriorly of said shutter-section, said stay being formed with an elongated opening and a cut-away portion connected with said opening, a movable pin connected with said shutter-section, said pin extending into said opening of said stay and being adapted to be moved into retaining engagement with said cut-away portion of the same so as to retain said shutter-section in opened position, a beam oscillatorily connected with said shutter-section, and means between said beam and said movable pin actuated by the movement of said beam for lifting said pin out of its retaining engagement with said cut-away portion of said stay, so as to permit said shutter-section to be closed.

7. In a device of the kind described, a hinged shutter-section, a retaining stay pivotally connected exteriorly of said shutter-section, said stay being formed with an elongated opening and a cut-away portion connected with said opening, a plate-like member connected with the side-portion of said shutter-section, said plate-like member being formed with an elongated opening, a slide-plate movably disposed upon said plate-like member, a pin on said slide-plate, said pin extending through the opening in said plate-like member and into said opening of the stay and being adapted to be moved into retaining engagement with said cut-away portion of said stay so as to retain said shutter-section in opened position, and means connected with said shutter-section and said slide-plate for moving the latter and lifting said pin out of its retaining engagement with said cut-away portion of said stay so as to permit said shutter-section to be closed.

8. In a device of the kind described, a hinged shutter-section, a retaining stay pivotally connected exteriorly of said shutter-section, said stay being formed with an elongated opening and a cut-away portion connected with said opening, a plate-like member connected with the side-portion of said shutter-section, said plate-like member being formed with an elongated opening, a slide-plate movably disposed upon said plate-like member, a pin on said slide-plate, said pin extending through the opening in said plate-like member and into said opening of the stay and being adapted to be moved into retaining engagement with said cut-away portion of said stay so as to retain said shutter-section in opened position, a stem or rod extending across a portion of said shutter-section, a sleeve oscillatorily mounted upon said stem or rod, a beam mounted upon one end of said sleeve, a push-piece for actuating said beam to oscillate said sleeve, and means between said beam and sleeve and said slide-plate for moving the latter and lifting said pin out of its retaining engagement with said cut-away portion of said stay, so as to permit the shutter-section to be closed.

9. In a device of the kind described, a hinged shutter-section, a retaining stay pivotally connected exteriorly of said shutter-section, said stay being formed with an elongated opening and a cut-away portion connected with said opening, a plate-like member connected with the side-portion of said shutter-section, said plate-like member being formed with an elongated opening, a slide-plate movably disposed upon said plate-like member, said slide-plate being also formed with an elongated opening, a pin on said plate-like member extending into and through the opening in said slide-plate, a pin on said slide-plate extending through the opening in said plate-like member and into said opening of the stay and being adapted to be moved into retaining engagement with said cut-away portion of said stay so as to retain said shutter-section in opened position, a coiled spring between said pins, and means connected with said shutter-section and said slide-plate for moving the latter and lifting said pin connected therewith out of its retaining engagement with said cut-away portion of said stay, so as to permit the said shutter-section to be closed.

10. In a device of the kind described, a hinged shutter-section, a retaining stay pivotally connected exteriorly of said shutter-section, said stay being formed with an elongated opening and a cut-away portion connected with said opening, a plate-like member connected with the side-portion of said shutter-section, said plate-like member being formed with an elongated opening, a side-plate movably disposed upon said plate-like member, said slide-plate being also formed with an elongated opening, a pin on said plate-like member extending into and through the opening in said slide-plate, a pin on said slide-plate extending through the opening in said plate-like member and into said opening of the stay and being adapted to be moved into retaining engagement with said cut-away portion of said stay so as to retain said shutter-section in opened position, a coiled spring between said pins, and a compound lever system connected with said shutter-section and operating said slide-plate to move the latter and lift said pin connected therewith out of its retaining engagement with said cut-away portion of said stay, so as to permit said shutter-section to be closed.

11. In a device of the kind described, a hinged shutter-section, a retaining stay pivotally connected exteriorly of said shutter-section, said stay being formed with an elongated opening and a cut-away portion connected with said opening, a plate-like member connected with the side-portion of said shutter-section, said plate-like member being formed with an elongated opening, a slide-plate movably disposed upon said plate-like member, said slide-plate being also formed with an elongated opening, a pin on said plate-like member extending into and through the opening in said slide-plate, a pin on said slide-plate extending through the opening in said plate-like member and into said opening of the stay and being adapted to be moved into retaining engagement with said cut-away portion of said stay so as to retain said shutter-section in opened position, a coil-spring between said pins, a stem or rod extending across a portion of said shutter-section, a sleeve oscillatorily mounted upon said stem or rod, a beam mounted upon one end of said sleeve, a push-piece for actuating said beam and sleeve, and means between said beam and sleeve and said slide-plate for moving the latter and lifting said pin connected therewith out of its retaining engagement with said cut-away portion of said stay, so as to permit said shutter-section to be closed.

12. In a device of the kind described, a hinged shutter-section, a retaining stay pivotally connected exteriorly of said shutter-section, said stay being formed with an elongated opening and a cut-away portion connected with said opening, a plate-like member connected with the side-portion of said shutter-section, said plate-like member being formed with an elongated opening, a slide-plate movably disposed upon said plate-like member, said slide-plate being also formed with an elongated opening, a pin on said plate-like member extending into and through the opening in said slide-plate, a pin on said slide-plate extending through the opening in said plate-like member and into said opening of the stay and being adapted to be moved into retaining engagement with said cut-away portion of said stay so as to retain said shutter-section in opened position, a coil-spring between said pins, a stem or rod extending across a portion of said shutter-section, a sleeve oscillatorily mounted upon said stem or rod, a beam mounted upon one end of said sleeve, a push-piece for actuating said beam and sleeve, a lever-like element mounted upon the other end of said sleeve, a crank-like plate pivotally connected with said shutter-section, a connecting-rod between said lever-like element and said crank-like plate, and a connecting-rod between said crank-like plate and said slide-plate, all arranged for actuating said slide-plate to disengage the pin connected therewith from its retaining engagement with said cut-away portion of said stay, so as to permit said shutter-section to be closed.

13. In a device of the kind described, a hinged shutter-section, a retaining stay pivotally connected exteriorly of said shutter-section, said stay being formed with an elongated opening and a cut-away portion connected with said opening, a movable pin connected with said shutter-section, said pin extending into said opening of said stay and being adapted to be moved into retaining engagement with said cut-away portion of said stay so as to retain said shutter-section in opened position, and a compound lever-system mounted in connection with said shutter-section for operating said movable pin to disengage the same from said cut-away portion of said stay to permit said shutter-section to be closed.

14. In a device of the kind described, a hinged shutter-section, a retaining stay pivotally connected exteriorly of said shutter-section, said stay being formed with an elongated opening and a cut-away portion connected with said opening, a movable pin connected with said shutter-section, said pin extending into said opening of said stay and being adapted to be moved into retaining engagement with said cut-away portion of said stay so as to retain said shutter-section in opened position, a lever-like element oscillatorily connected with said shutter-section, means for oscillating said lever-like element, and a compound lever-system mounted in connection with said shutter-section, and connected operatively with said movable pin and said lever-like element for actuating the former to disengage the same from said cut-away portion of said stay to permit said shutter-section to be closed.

In testimony, that I claim the invention set forth above I have hereunto set my hand this 19th day of December 1911.

CARL J. HAGSTROM.

Witnesses:
FREDK. C. FRAENTZEL,
FREDK. H. W. FRAENTZEL.